US007009733B2

(12) United States Patent
Gruzdev et al.

(10) Patent No.: US 7,009,733 B2
(45) Date of Patent: Mar. 7, 2006

(54) MANUAL CORRECTION OF AN IMAGE COLOR

(75) Inventors: Pavel Vladimirovich Gruzdev, St. Petersburg (RU); Mikhail Evgen'evich Tatarnikov, St. Petersburg (RU); Krzysztof Antoni Zaklika, Saint Paul, MN (US)

(73) Assignee: Coral Corporation, Ottawa (CA)

( * ) Notice: Subject to any disclaimer, the term of this patent is extended or adjusted under 35 U.S.C. 154(b) by 811 days.

(21) Appl. No.: 09/897,769

(22) Filed: Jul. 2, 2001

(65) Prior Publication Data

US 2003/0002095 A1 Jan. 2, 2003

(51) Int. Cl.
*H04N 1/60* (2006.01)
*H04N 1/407* (2006.01)

(52) U.S. Cl. ........................ 358/1.9; 358/518; 358/521

(58) Field of Classification Search ................ 358/518, 358/500, 504, 520, 521, 522, 534, 1.9, 519; 382/162, 167

See application file for complete search history.

(56) References Cited

U.S. PATENT DOCUMENTS 2,571,697 A 10/1951 Evans ............................. 95/2
4,339,517 A 7/1982 Akimoto ...................... 430/30
4,685,071 A 8/1987 Lee ............................ 364/526
4,729,016 A 3/1988 Alkofer ....................... 358/80
4,984,071 A 1/1991 Yonezawa .................... 358/80
5,062,058 A 10/1991 Morikawa ................... 364/521
5,115,229 A * 5/1992 Shalit ......................... 345/2.2
5,117,293 A 5/1992 Asada et al. ................ 358/298
5,233,413 A 8/1993 Fuchsberger ................. 358/80
5,323,241 A 6/1994 Yonezawa ................... 358/298
5,345,315 A * 9/1994 Shalit ......................... 358/406
5,357,352 A 10/1994 Eschbach .................... 358/518
5,371,615 A 12/1994 Eschbach .................... 358/515
5,420,704 A 5/1995 Winkelman ................. 358/520
5,487,020 A 1/1996 Long ..................... 364/571.01
5,495,428 A 2/1996 Schwartz .................... 364/526

(Continued)

FOREIGN PATENT DOCUMENTS

EP 0 862 336 A2 9/1998

(Continued)

*Primary Examiner*—Scott A. Rogers
(74) *Attorney, Agent, or Firm*—Hensley Kim & Edgington, LLC

(57) ABSTRACT

A color correction device for correcting colors in a color image comprises:

coordinates for registering points in a first color space of at least one standard point, the first color space having axes for specifying colors;

a second set of coordinates for registering points in a second color space of at least one standard point, the second color space having coordinates that include at least one coordinate for specifying color hue;

a translator to convert image data of at least one point in the first color space to coordinates in the second color space;

a modifier for modifying at least hue within image data in the second color space to form corrected image data in the second color space; and a translator for transferring corrected image data in the second color space to corrected image data in the first color space.

The color correction device may include a means for creating a tone reproduction curve based on conceptually moving one or other limit of a range of image color values in order to provide a tone reproduction curve with improved rendering of the color correction.

29 Claims, 1 Drawing Sheet

U.S. PATENT DOCUMENTS

| | | | | | |
|---|---|---|---|---|---|
| 5,506,946 | A | | 4/1996 | Bar et al. | 395/131 |
| 5,694,484 | A | | 12/1997 | Cottrell et al. | 382/167 |
| 5,696,889 | A | * | 12/1997 | Morikawa | 358/1.9 |
| 5,742,520 | A | | 4/1998 | Uchikawa et al. | 364/526 |
| 5,796,865 | A | * | 8/1998 | Aoyama et al. | 382/169 |
| 5,825,916 | A | | 10/1998 | Denber | 382/162 |
| 5,943,059 | A | | 8/1999 | Satoh et al. | 345/431 |
| 5,963,244 | A | * | 10/1999 | Mestha et al. | 347/251 |
| 6,016,168 | A | | 1/2000 | Kim | 348/661 |
| 6,058,208 | A | | 5/2000 | Ikeda et al. | 382/167 |
| 6,097,836 | A | * | 8/2000 | Inoue | 382/165 |
| 6,104,830 | A | | 8/2000 | Schistad | 382/167 |
| 6,128,001 | A | | 10/2000 | Gonsalves et al. | 345/150 |
| 6,151,410 | A | | 11/2000 | Kuwata et al. | 382/167 |
| 6,462,836 | B1 | * | 10/2002 | Sato et al. | 358/3.01 |
| 6,614,456 | B1 | * | 9/2003 | Rzepkowski et al. | 715/833 |
| 6,717,698 | B1 | * | 4/2004 | Lee | 358/1.9 |
| 6,753,987 | B1 | * | 6/2004 | Farnung et al. | 358/518 |
| 6,798,536 | B1 | * | 9/2004 | Muramoto | 358/1.9 |
| 6,850,259 | B1 | * | 2/2005 | Rzepkowski et al. | 715/835 |
| 2002/0140956 | A1 | * | 10/2002 | Maltz | 358/1.9 |
| 2003/0142110 | A1 | * | 7/2003 | Murashita | 345/600 |

FOREIGN PATENT DOCUMENTS

| | | |
|---|---|---|
| WO | WO 97/01151 | 1/1997 |

* cited by examiner

MANUAL CORRECTION OF AN IMAGE COLOR

BACKGROUND OF THE INVENTION

1. Field of the Invention

The present invention relates to imaging technology, color imaging technology, digital color imaging technology, correction of color imbalances in digital color images, and blended manual/software systems for correcting such color imbalances.

2. Background of the Art

The proliferation of digital imaging means such as photography, scanning, copying, printing and digital cameras has resulted in a large volume of color imagery being generated. As no device produces consistently perfect color, especially in the hands of unskilled amateurs, there is a need to correct the color of the images ultimately provided. In particular, it is often required that a specific color or range of colors is rendered correctly. This is especially true of so called "memory" colors, such as skin tones and the colors of the sky, vegetation and certain foodstuffs (e.g. bananas, lemons, oranges, strawberries, red apples, etc.). Humans have a very strong sense of when such colors are correct, and an image with otherwise good color balance can be rejected as unsatisfactory if these particular tones are not judged to be perfect. Other situations where the correctness of specific colors is critical includes colors associated with product brands, where logos and packaging must maintain a consistent look across many images even at the expense of some slight shifts in other colors. It is also acknowledged that different cultures have shown preferences for different color balances or saturation levels, based on exposure to particular color schemes during culturalization.

It is well know to correct the color balance of an entire image and a number of methods are used, most of which provide some level of automation. One method corrects by recovering the color of the illuminant, as exemplified by U.S. Pat. No. 4,685,071, U.S. Pat. No. 5,495,428, U.S. Pat. No. 5,825,916 or U.S. Pat. No. 6,104,830. The illuminant can also be recovered from the gamut of colors in the image as disclosed in European Pat. No. 862,336. Another approach is based the assumption that the colors of an image average to gray. The original patent in this area is U.S. Pat. No. 2,571,697 and improvements are provided in U.S. Pat. No. 5,233,413; U.S. Pat. No. 5,357,352 and U.S. Pat. No. 5,420,704. It is also known in the art to use statistical analyses of the properties of commonly encountered images to determine optimal whole image color correction. This is taught in include U.S. Pat. No. 4,339,517 and U.S. Pat. No. 6,097,836 and, in a related way, in U.S. Pat. No. 5,694,484 and WO 97/01151. There are additional correction procedures of a more or less empirical nature such as those of U.S. Pat. No. 4,729,016, U.S. Pat. No. 4,984,071, U.S. Pat. No. 5,117,293, U.S. Pat. No. 5,323,241, U.S. Pat. No. 5,371,615 and U.S. Pat. No. 6,151,410. Related correction procedures are provided in software by the "Auto Levels" feature of Photoshop 5.5 (Adobe Systems Incorporated, 345 Park Avenue, San Jose, Calif. 95110-2704) or the "Auto Tonal Adjustment" feature of PhotoStyler 2.0 (Aldus Corporation, 411 First Avenue South, Seattle, Wash. 98104).

It is also well know to correct the color balance of an image manually. For example, an operator may specify a black or white point in the image or a color that should be considered as neutral gray. Such a capability is available as software in the "Curves" feature of Photoshop 5.5 (Adobe Systems Incorporated, 345 Park Avenue, San Jose, Calif. 95110-2704), the "Balance to sample" feature of PhotoStyler 2.0 (Aldus Corporation, 411 First Avenue South, Seattle, Wash. 98104), and in the "Automatic" mode of the "Tint" feature in PhotoDraw 2000 (Microsoft Corporation, One Microsoft Way, Redmond, Wash. 98052-6399). Correction using manually specified highlight and shadow regions is disclosed in U.S. Pat. No. 5,062,058 and the falls within the claims of U.S. Pat. No. 5,487,020. However, neither these methods nor the aforementioned automated methods provide a means of correcting a specific color in an image.

Local color modification in an image can be accomplished by restricting the region of the image in which changes take place. U.S. Pat. No. 5,943,059 teaches a method of modifying the colors of elements of a business graphic, which are specified by means of an index of elements within the image. However, this method is not applicable to general imagery and, even in the restricted area of business graphics, is of only a slight benefit if the image does not contain a pre-existing index of elements. U.S. Pat. No. 5,742,520 discloses color correction by means of detection of approximately 10 to 12 color categories within an image. Such a method is insufficiently exact for images containing several million colors or more and cannot be used to denote a specific critical color for correction, being restricted to pre-determined color categories. U.S. Pat. No. 6,016,168 discloses a method of strengthening or weakening a specific color in an image based on its location in a region of RGB chromaticity space and a pre-established set of correction factors for these regions. This procedure does not permit the operator to choose the color to be corrected nor to select a replacement color for the color being modified and is, moreover, incapable of differentiating colors by their brightness.

A number of other methods for local color modification are known in the image editing art. One prior art procedure is to select the region to be modified using commonly available freehand selection tools such as a "shaped selection tool" (e.g. a rectangle or circle), the "lasso tool" or "point to point selection tool" as found in image editing software such as Paint Shop Pro 7 (Jasc Software Inc., 7905 Fuller Road, Eden Prairie, Minn., 55344). Another prior art method is to select an image region for modification according to color range. This can be accomplished by the method of "magic wand" selection in Paint Shop Pro 7 and other image editors or by the related procedure taught in U.S. Pat. No. 5,506,946. In addition to being laborious, these selection methods result in a discrete edge to region being corrected. After the correction the abrupt change in color at this edge can result in an unnatural look to the image. While it is know to anti-alias, feather or otherwise blur such edges, the optimal amount of such blurring is image dependent and requires trial and error to determine. U.S. Pat. No. 5,506,946 teaches a fixed amount of smoothing that will not be appropriate for arbitrary images in a range of sizes. U.S. Pat. No. 6,128,001 discloses a related procedure wherein the region of the image to be modified is defined by an alpha matte. A third prior art method of modifying color is by means of a brush that is passed over a region of the image to be altered. The majority of such brushes have the disadvantage that lightness and saturation variation within the region being modified are replaced by a single uniform and invariant color. However, it is also possible to retain such texture detail in the modified area of the image by means of a special brush. An example is the "retouch tool" of Paint Shop Pro 7 in the "hue to target" or "color to target" mode. The brush is controlled by means of a pointing device such as a mouse, trackball or pen and tablet, and can be integrated with a touch-screen. Considerable dexterity and skill is required to successfully modify an image in this way. Furthermore, an operator must have the necessary experience to properly set brush characteristics so that the region of modified color blends undetectably with the rest of the unmodified image.

ColorPilot® 4.10 (Invention office RG, kv.7, d.8, ul. Shkolnaia, Kokoshkino, Moskovskaia obl. 143390, Russian Federation) is a software program offering an alternative approach to color correction. The operator first roughly marks a region of an image as containing a source color to be modified and then selects a target color that will replace the source color. In consequence, the average source color is, in principle, converted to the average target color while other colors in the image undergo an intermediate and appropriate change. However, in practice, though the procedure works well with colors of medium brightness, the use of this type of method with colors of low brightness or high brightness gives very poor results. The latter (high brightness) is particularly important because skin tones are often of high brightness and their proper correction is critically important to the viewer of the image. The former (low brightness) can lead to unpleasant and muddy blacks. Color is conveniently characterized by hue, brightness and saturation (or equivalents thereof) of which hue is most significant, determining, for instance, whether a color is considered green or blue or whether one color is more red than another. ColorPilot® permits transfer of all three of these characteristics from target to source, or of brightness only, or of a combination of hue and saturation. However, there is no method for independently transferring from target to source only hue, the chief attribute of color, or combinations of only hue and brightness. This severely limits the ability to correct the color and as a result can yield unnatural color shifts in the modified image. Additionally, even when only the hue and saturation of the target color are applied to the image, the brightness is in fact observed to change, undesirably disrupting the contrast characteristics of the image.

U.S. Pat. No. 6,058,208 claims a color correction device for correcting colors in a color image, comprising: standard point registration means for registering coordinates in a color space of at least one standard point, the color space having axes for specifying colors and a standard point representing a color to be used as a standard for color correction; object point registration means for registering coordinates in the color space of an object point for each standard point, each object point representing a desired color to be achieved by color correction of a standard point; and correction standard indication means for receiving an indication of at least two pairs of a standard point and an object point that are arbitrary points in the color space, and for registering standard points and object points of at least two pairs in the standard point registration means and the object registration means respectively; and coordinate conversion means for determining a single mapping function which simultaneously maps all of the standard points registered in the standard point registration means to respective corresponding object points registered in the object point registration means and which can be used for mapping any arbitrary point in the color space, and for generating a corrected color image from an inputted pre-correction image using the mapping function. Thus, this invention, like ColorPilot®, uses source and target colors but requires not one but two pairs of such colors. To a person seeking to correct one specific color, the need to select a second color is redundant and experience shows that simultaneous correction of two colors is more difficult for an unskilled operator than if the operator can focus only on the single color to be corrected. Moreover, the method disclosed requires a complex correction to be computed iteratively using weighting of colors by their distance from the source colors and, as a result, is undesirably slow. U.S. Pat. No. 5,487,020 claims a method for color correcting a predetermined portion of a color image, said color image comprising a plurality of pixels and a plurality of color information channels for each of said plurality of pixels, said method comprising the steps of: selecting in said predetermined portion a first input reference color of a first pixel and a corresponding first desired output color of the first pixel; selecting in said predetermined portion a second input reference color of a second pixel and a corresponding second desired output color of the second pixel; defining a linear color transformation for each color information channel based on the input reference colors and the desired output colors; applying said linear color transformation to all pixels in said predetermined portion; and displaying the color image. This procedure, again requiring two pairs of source and target colors, is not suited to the correction of a single color and, by virtue of linear correction, does not permit independent choice of hue, brightness and saturation.

SUMMARY OF THE INVENTION

One aspect of this invention is to provide a means of correcting a specific color or specific range of colors in an image wherein remaining colors (e.g., colors and/or ranges of colors outside the scope of the specific color and/or specific range selected) are modified to a degree smaller than the change in the color or color range being corrected.

A further aspect of the invention is to provide a means of correcting a specific color or range of colors in an image wherein remaining colors are modified to an amount that decreases with respect to an increase in the degree of difference between the remaining color and the color being corrected.

Another aspect of the invention is to provide a means of modifying a specific color or specific range of colors in an image to provide a specific hue, wherein the modified color may be provided with a selected brightness or saturation.

Yet another aspect of the invention is to provide a system for modifying specific dark or light colors, or specific ranges of such colors in an image without introducing unpleasant artifacts in the remaining colors of the image or loss of image detail.

A still further aspect of the invention is to provide a system for modifying the hue and, optionally, the brightness and saturation of a color or range of colors in an image, wherein the definitions of hue, brightness and saturation have good correspondence to human perception.

An additional aspect of the invention is to provide a system for modifying a specific color or range of colors in an image by providing a choice of pre-arranged and named replacement colors selectable from a palette, look-up table, or the like.

A still additional aspect of the invention is to provide a system for modifying a specific color or specific range of colors in an image by providing representative examples of replacement colors of the type known as memory colors, as defined before.

Still another aspect of the invention is to provide a system for modifying a specific color or specific range of colors in an image by providing the operator with a means to prepare and retain a set of replacement colors.

A yet further aspect of the invention is to provide a system for modifying a specific color or specific range of colors in an image by permitting the replacement color to be selected from the image being corrected or from a second image.

These and other aspects of the invention are achieved by: taking an image with colors represented within a color system or color space, for instance, in the RGB color space; defining a color or range of colors in an image that is to be modified; converting a representation of this color to a color space, especially by permitting a definition of hue, lightness and saturation (or their equivalents) if the current color space does not permit this; computing the hue, saturation and lightness of the color in this color space; replacing the hue and, optionally the saturation or lightness or both of this color with a hue (and as desired, the saturation and lightness) selected from a specified target color to form a replacement color; converting the replacement color (as measured in the second color space format, e.g., hue, saturation and lightness) to the original color space format if a previous color space conversion was required; and constructing a look-up table in the original color space to convert the specific colors of the image. The look-up table is constructed, for example, from the color channel components of the original source color and the replacement color along with the lowest and highest values which can be represented in a color channel and the look-up table's construction is subject to certain rules, whereby one or other end of the look-up table function may be moved outside the range of representable values for a channel when the source color is within a certain threshold of the limits of this range.

DETAILED DESCRIPTION OF THE INVENTION

Figure 1:
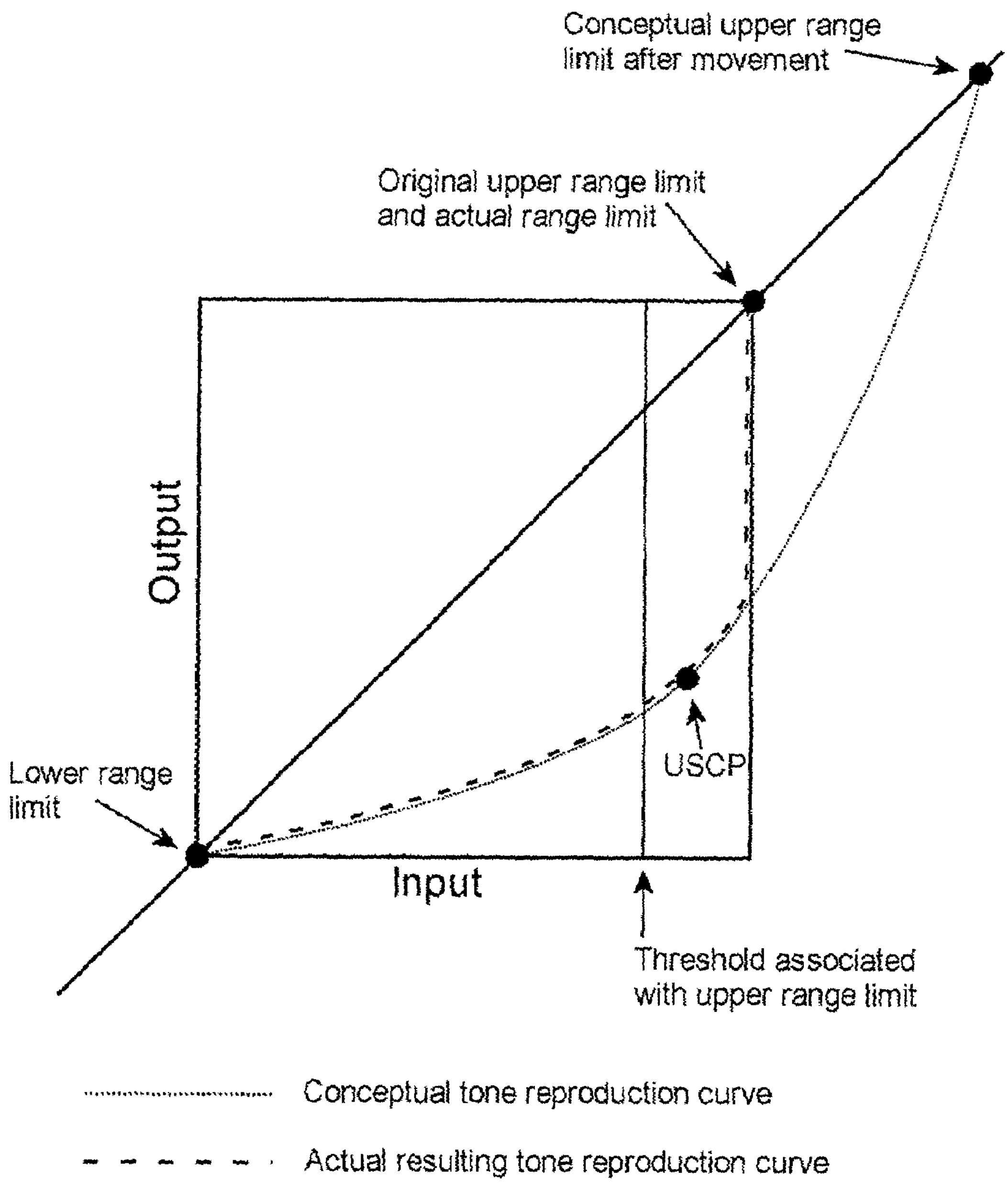
FIG. 1 shows a series of tone reproduction curves before and after adjustment, with the provision of a conceptual upper range limit displayed.

The invention operates on digital images in which information is supplied as a grid of points or pixels. Each pixel is associated with several numbers representing color information. Typically, these are three 8- or 12- or 16-bit values representing respectively red (R), green (G) and blue (B). While the invention will be illustrated using such RGB images as examples, it will be understood that more than three colors can be used to represent color information, that the color space used to define color need not be restricted to RGB (e.g., other color space values and formats may be used), and that the color information is not restricted to any specific form of numeric representation (e.g., linear, angular, digital, analog, etc.). Although the invention will be described in terms of calculations using all image pixels, it also understood that the invention may be applied to only a portion of the image pixels. Even though the invention will be described in terms of certain illustrative embodiments, it will be understood that a wide variation of specific realizations of the invention is possible within the scope of the enablement and description of the invention provided herein. For convenience, the invention will be described as a sequence of steps but it is also understood that the order of these steps may be changed and that the several steps or certain of the steps can be combined into a single step.

A general description of the practice of the invention includes a process and a computer that can execute the process and contains a color correction device or system (e.g., hardware and software) for correcting colors in a color image comprising:

- coordinates for registering points in a first color space of at least one standard point, the first color space having axes for specifying colors;
- a second set of coordinates for registering points in a second color space of at least one standard point, the second color space having coordinates axes that include at least one coordinate for specifying color hue;
- a translator to convert image data from at least one point in the first color space to coordinates in the second color space;
- a modifier for modifying at least hue within image data in the second color space to form corrected image data in the second color space;
- a translator for transferring corrected image data in the second color space to corrected image data in the first color space.

The modifier alters hue and from zero to two other color components selected from lightness and saturation in the second color space. The first color space preferably comprises a three-color color space, such as a three-color color space of red, green and blue.

A method for correcting colors in a color image may comprise

- providing image data of points in a first color space, the first color space having axes for specifying colors;
- converting image data points in the first color space into image data points in a second color space, the second color space having axes that include at least one coordinate for specifying color hue;
- modifying at least hue of at least some data points within image data in the second color space to form corrected image data in the second color space; and
- transferring corrected image data in the second color space to the first color space as corrected data. The first color space may define colors in color channels, for example, in color channels of red, green and blue. The modifying of at least hue may comprise, for example, modifying hue and at least one other color space component selected from the group consisting of lightness and saturation, such as modifying at least hue comprises modifying hue and both lightness and saturation. The modifying may, for example, be effected by a procedure selected from the group consisting of selecting specific image color data to replace converted image data in the second color space, selecting a palette from which to select specific a color to replace converted image data in the second color space, and selecting colors from a look-up table. The image data points in the first color space may be, for example, selected for correction by application of a pointer to a representation of the image.

The process may include modifying image data in the second color space, and where there is no direction given in the modification to alter saturation, a predetermined amount of change in saturation may be provided into image data in the second color space to cause a slight visual change of the image.

A first general description of the practice of the invention may be described as follows.

A method is used to provide a tone reproduction curve relating to a first image, the tone reproduction curve defined by at least three points selected from the group consisting of an original minimum color value, an original maximum color value, and a user specified control point (USCP). Each of the original minimum color value and the original color value is a color range limit for the image. The USCP represents a change in color value from an original color value in an image to a desired color value. The method comprises:

- defining at least one threshold color value, the threshold color value defining a threshold color value in relationship to a range limit. That is, a value of the color value is selected (e.g., defining a range covering a continuous range up to 40% of all color values, up to 30% of all color values, up to 25% of all color values, up to 20% of all color values, up to 10% of all color values) adjacent to a range limit. The threshold color value defines a threshold wherein if the USCP lies between a range limit and the threshold value associated with that range limit, the range limit is conceptually moved from its original position and away from the threshold. The degree of movement of the range limit increases with the distance of the USCP from the threshold. (This is analogous to the Physics problem solution with mirrors where an observed point in reflection or refraction is conceptually drawn in a conceptual space). After the original range limit has been conceptually moved or positioned, the program creates a monotonic tone reproduction curve drawn through a) the conceptual minimum color value or conceptual maximum color value (i.e., the range limit that was moved), b) the USCP, and the original minimum color value or original maximum color value that was not associated with the threshold (i.e., the range limit that was not moved). That is, if the conceptual color value was created by moving the maximum color value, then the third point is the original minimum color value. The monotonic tone reproduction curve preferably restricts color values that may be selected for imaging from the curve to color values between the original maximum color value and the original minimum color value. This is done because it is neither useful nor helpful to have a tone reproduction curve that allows selection of color values that cannot be produced by the imaging apparatus associated with the tone reproduction curve. The above procedure is illustrated in FIG. 1 with respect to a USCP that lies between the upper range limit (i.e., the maximum color value) and its associated threshold and describes the concept of movement of the range limit. The conceptual movement of the range limit occurs along the line joining the two original range limits. The figure shows the original upper range limit, which is also the actual range limit for the image data. Additionally, it shows a displaced conceptual upper range limit and the associated conceptual tone reproduction curve constructed through the original minimum range limit, the USCP, and the displaced conceptual upper range limit. Further, the resulting actual tone reproduction curve is illustrated.

The monotonic tone reproduction curve is preferably created by selecting a first color to be corrected, selecting a second color to replace the first color, and using the first and second color to define the USCP. The selection of the second color may be done in a variety of ways. By way of non-limiting examples, the second color may chosen by an operator selecting a color from within the first image (e.g., by using a pointer or other field selection device), by an operator selecting a color from a second image (e.g., again by an operator using any form of pointer or selection device), or by selecting the second color from a stored collection of colors. The stored collection of colors may be provided in many different forms and formats. The stored collection of colors is stored as generic named files or categories. These generic names identify a generic class where a palette of specific colors can be found, usually with species having specific names or sub-files or sub-categories. A non-limiting list of generic named files or categories might comprise at least one generic named file selected from the group consisting of grass, grasses, foliage, skin tones, flesh tones, trees, sky, wood, stained glass colors, eyes, hair, fruits, vegetables, water, sun, dawn, dusk, sunrise, sunset, foods, beverages, and animals. Within the generic named files would be a list of named species files or sub-files. For example, under eyes might be a list of specific colors such as blue, green, brown, gray, hazel, purple, etc. Under fruits might be a list of specific colors such as lime, lemon, strawberry, blueberry, watermelon, delicious red, granny apple, raspberry, apricot, peach, and the like. Under beverages might be red wine, white wine, rosé wine, tea, coffee, green tea, cola, orange juice, orange soda, bloody Mary, single malt whisky, pina colada, Strawberry daiquiri, vanilla milk shake, etc. This type of generic listing with a collection of species provides a very rapid tool for the user to access that can provide highly desirable colors without difficult manipulation of a pointer on a scale of colors. As human perception tends to be intolerant of differences of colors on certain objects, this filing format provides an excellent tool for even skilled users to be able to rapidly access specific colors for specific image components.

The method may allow the monotonic tone reproduction curve to restrict color values that may be selected for imaging from the curve to color values available from an associated image reproduction system.

In general, a first step may be considered to be to provide or define a specific source color or specific range of colors in the image that is to be modified or corrected. This color may be defined by means of specification of color coordinates (e.g., within a color space framework) or ranges of such coordinates or by selection of colors from a palette (e.g., even where an operator may point and click to colors within the palette or in the image). However, it is usually more convenient to define the color by indicating it in the image by means of a pointing device such as a mouse, trackball, touch screen, light wand, or pen. It is sufficient to indicate only a single pixel of the image to designate the source color. It is preferable, however, to designate several pixels as representative of the source color since this reduces the effect of image noise on the definition of the source color. A suitable number of pixels to use is, for example, about four or about nine or about 25 pixels. Nonetheless, larger numbers of pixels may be used without causing any harm. It is sufficient to choose as the designated several pixels, one instance of the source color from only one region of the image even though the same color may be present in other regions of the image. Provided that a reasonable sampling of the color is made, it not necessary to sample all of that particular color in any given region of the image. For this reason, the sampling of multiple pixels may be implemented very simply, for instance by dragging out a sampling rectangle on the image, since no great accuracy is required. However, to cope with source color areas of complex shape it can be helpful to provide a means of selecting areas of arbitrary shape (either a convenient geometric shape, specifically sculpted shape, etc.), for example, using what is know in the art as a freehand or lasso selection tool. Performing the process by this method also provides a level of comfort for inexperienced operators who are accustomed to the need for accurate region selection in other aspects of image processing and, being unfamiliar with the idea that an approximate color designation is sufficient, suffer frustration when using simple selection tools. If more than one pixel is used to designate the source color, it is necessary to form a representation of the source color in terms of its color components, here exemplified by R, G and B. This representation may be taken in any convenient way. For example, it may be computed as the average, the median, a mean value, the mode, or the centroid (i.e. [maximum−minimum]/2). It is possible to compute the representation differently for different channels, something that may be especially valuable if the original image color is defined by hue, lightness and saturation channels or by the channels of an opponent color space. Normally it is sufficient to form the representation of the source color by a simple averaging of the individual color components of the colors making up the source color definition.

The second step, for example, is to define a target replacement color value for the selected source color representation. There are a variety of possible ways of doing this. One method is by explicitly specifying the color coordinates of the replacement color in some suitable color space. This may be done by entering color coordinates directly or indirectly. This can be done, for instance, by modifying color coordinates using slider controls on a computer system. A second method is to select a color by eye (visually by an operator) from a continuously varying color spectrum or provided range of color spectrum. Such types of selection means are generally well known in the art and have existed in Paint Shop Pro for some years, although they have not been used in the manual correction of color balance. A third method is to select the color from a palette of colors or from a collection of color palettes. It is preferred that such a palette contains a selection of memory colors or a selection of memory color palettes specific to reference classes so that common items such as skin tones (e.g., from a skin tone palette), sky colors (from a sky color palette) or the colors of vegetation (vegetation color palette) or foodstuffs (food palette) can readily be corrected without any knowledge of color science, since a name or description can be used to select the color (or subject matter palette) without reference to color concepts. It is particularly preferred to create a selection of colors in different categories based on some form of statistical sampling of colors from high quality images. Thus, for example, it is possible to prepare a skin tone color category containing samples of the skin colors of people of various ethnic origins, with sub-palettes available for call up. A sky color category can contain sky colors corresponding to varying degrees of cloudiness or haze, or to the colors of a sunset or sunrise. A grass color category can contain samples of parched grass, dry grass, muddy grass, normal grass and specific varieties of grass, such as Kentucky blue grass. A foliage color category can contain colors for deciduous or evergreen trees, corresponding to different illumination conditions (e.g. low sun) or to different times of year, permitting inclusion of autumnal colors. A foodstuff category can include vegetables or fruits, particularly those with very characteristic colors (e.g. lemons, oranges, bananas), as well as meats, baked goods or condiments. A beverage category can contain colors of alcoholic drinks such as various wines, beers and spirits as well as non-alcoholic drinks such as coffee or tea and the like. An eye color category can be equipped with colors representative of the hues and shades found in human or animal eyes. A color category providing examples of water in various environments can also be provided, with instances of various sea and lake colors, along with white water or stagnant water or muddy water. Depending on need, various additional specialized color categories can be created, for instance categories of various types of metals or of different varieties of woods. The color categories are meant to be exemplary rather than restrictive and the choice of categories can vary widely depending on the intended application of the invention. For example, in an application involving corporate media asset management, there may be a color category containing the colors characteristic of certain products or corporate brands. It is additionally useful to provide some specialized color categories containing, for instance, a selection of common named pure colors (such as red, green, blue, yellow, cyan, magenta, white, black and the like) or containing a selection of neutral grays ranging stepwise in lightness from pure black to pure white. A preferred number of steps is from about 20 to about 255, with a number of about 100 (e.g., 75–150, 80–120, 90–110, etc.) being especially preferred. It is also advantageous to provide a set of colors of constant or near constant lightness and constant or near constant saturation but varying over the entire hue range. Selection from this color category permits the hue of the source color to be varied stepwise. These colors may be arranged in sequence with a constant hue spacing or a varying hue spacing. Particularly preferred are equally spaced colors with hue differences derived from an approximately perceptually uniform color space. A suitable number of such hue samples is from about 50 to about 360, with a preferred number of about 120 (e.g., 80–160, 100–140, etc.). A fourth method of defining the target replacement color is to select it from another image using any conventional selection method, such as by means of a pointing device. For example, multiple images may be placed on the screen, the first being the original image and the second being a reference image. A color on the original image to be corrected is identified, and indicated to the apparatus (e.g., as by pointing or framing). The replacement color is identified (e.g., again by any convenient method such as pointing or framing), and that replacement color is then shifted or transported into the original image data by directing the program to shift or translate or transport that color from the designated area of the reference image to the designated area of the original image. This method of defining target colors is especially valuable for correcting a series of images of similar subjects obtained from a single source, such as a digital camera. The method is also especially valuable when it is desired to assemble several images into a single panoramic image so that their colors must match accurately in order for the panorama to appear seamless. A fifth method of defining the target replacement color is to select it from the image being modified. This method is especially advantageous when it is desired to correct stained, bleached or faded regions within an otherwise acceptable image. Here it is required that the corrected area accurately matches adjacent uncorrected areas. This method is also useful for correcting colors of objects that have been bleached or desaturated in some regions through proximity to photographic flash or where specular reflections occur from some objects in the image. Though five specific methods for selecting the target replacement color have been described, it will be appreciated by those with ordinary skill in the art that any convenient method may be used, including methods not listed here.

A third step of the invention, for example, is to convert the target replacement color specification into a reference color space permitting hue, saturation and lightness to be defined. If the image color space being used to define source and target colors already supports the concepts of hue, saturation and lightness, conversion to a reference color space may not be necessary. However, even in such a case, it may be desirable to perform a conversion to an alternative color space in order to receive results more in accord with human perception. Suitable reference color spaces are those such as HSL, HVC, HSB or the Munsell color space, whose coordinates represent hue, saturation and lightness or their equivalents. Also suitable color spaces are opponent color spaces in which there is a lightness (or equivalent) axis normal to a chrominance plane. Hue can be defined as a rotation angle about the lightness axis with an arbitrary zero, for example, at a color near red. Saturation can be defined as distance of a color from the lightness axis in a chrominance plane. Examples of such color spaces include YIQ, YUV or YES. Particularly preferred are color spaces with approximate perceptual uniformity such as CIE L*a*b* or CIE L*u*v*. In the case of CIE L*a*b* it is desirable to use a representation of the space in terms of lightness, hue and chroma (LHC). The complexity of the color space transformation is unimportant since only two discrete colors require conversion, which can be achieved very rapidly. It is not, however, a requirement of the practice of the invention to use this computational simplification and every color in the original image may be converted to the reference color space if it is so desired.

In a fourth step, for example, the operator determines which characteristics of the target replacement color, as defined in the reference color space, will be applied to replace those of the source color defined in the same reference color space. However, in doing so it must be understood that when saturation or chroma of the color are very low the hue is undefined or hard to define with accuracy. If such a situation arises, the hue of the source color is not modified. A preferred threshold for leaving hue unchanged is a chroma value of about 5 in the CIE LHC color space derived from CIE L*a*b*. If chroma or saturation of the source color exceeds the pre-determined threshold, the hue of the source is replaced by the hue of the target. Optionally, the lightness or the saturation of the target color or both can also replace those of the source color. Thus, for example, in terms of a source color $L_SH_SC_S$ and a target color $L_TH_TC_T$ in the CIE LHC color representation, the characteristics of the color replacing the source color may be $L_SH_TC_S$, $L_SH_TC_T$, $L_TH_TC_S$ or $L_TH_TC_T$. In the case of the last, the replacing color is identical in all respects to the original target replacement color. Though hue is the characteristic most often associated with the modification of color, it is also possible to leave hue unchanged but modify either lightness or saturation or both, provided at least one of hue, lightness or saturation is modified. While the selection of the color that replaces the source has been described simply in terms of combining reference color components, it will be apparent that additional possibilities exist for selecting the replacement color. For example, it is possible to interpolate between the source and target hues, lightness values or saturation values. It is also possible to extrapolate a replacing color on the basis of these two colors. It is further understood that such an extrapolation may take several forms, in particular to adjust to the fact that colors in the reference color space may not lie within the gamut of possible colors represented by the original color space of the image data. Additional modifications are also possible to adapt to the lack of knowledge of color science by the operator. For example, many inexperienced people believe neutral colors such as black, gray or white to be normal colors like any others (e.g. red, green or blue) rather than achromatic colors without hue and with zero saturation. As a result, when the operator specifies that saturation should remain unchanged when applying the target color to a neutral achromatic source color, he or she is confused that no visible difference in the image occurs. In such a situation allowing a small change in the saturation even though formally saturation should remain unchanged results in a slight visual change of the image and eliminates the operators confusion. For example, in terms of a CIE LHC reference color space, the following approach has been found satisfactory. If $C_S$ and $C_T$ are both less than 5 the chroma of the replacing color is taken as 0.5 ($C_S$+$C_T$). Otherwise, if $C_T$ is less than 5 but $C_S$ is greater than 5, the chroma of the replacing color is taken to be $C_S$−2.5. Finally, if $C_S$ is greater than 5 and $C_T$ is less than 5, then the chroma of the replacing color is taken as $C_S$. Whatever means are employed to determining the hue, lightness and saturation of the color replacing the source color, the final result of this step can be a definition of the source color representation in the original color space of the image and a definition of the replacing color (hereinafter referred to as the target color) also in the original color space of the image. This is accomplished by converting the target color from the reference color space to the original color space of the image.

The fifth step concerns construction of a look-up table for each color channel, generally of the color space originally used for the image data, for the purpose of modifying the color data to reflect conversion of the source color to the target color. For any given color channel of an image (such as R, G or B) the values of a color channel of the original image can be designated by X and of the modified image by Y. A conventional look-up table is represented as a function giving values Y corresponding to values of X and passing through a point $X_{min}$,$Y_{min}$ (e.g., 0,0) representing the minimum value possible in a color channel, a point $X_{max}$, $Y_{max}$ (e.g. 255, 255) representing the maximum value possible in any channel, and a point $X_S$,$Y_T$ where $X_S$ and $Y_T$ represent respectively the values of source and target colors in the given color channel of the image. Any convenient or prior art function may be used to construct the look-up table provided that it is smoothly monotonic, for example, a gamma function, a parabola or a spline. This method of look-up table creation represents conventional art and is satisfactory for colors $X_S$ lying near the center of the range from $X_{min}$ to $X_{max}$. However, when $X_S$ is close to one of the range limits $X_{min}$ or $X_{max}$ unsatisfactory results are obtained. While $X_S$ is correctly converted to $Y_T$, large and undesirable color changes occur for other colors, especially in the interval between $X_S$ and the more distant range limit. Accordingly, the invention provides a solution to this problem, which takes the following form, which is illustrated in FIG. 1. $X_{low}$, $Y_{low}$ and $X_{high}$, $Y_{high}$ are defined as the limits of the look-up table function. In the conventional art these points correspond to $X_{min}$, $Y_{min}$ and $X_{max}$, $Y_{max}$ respectively. The useful range of the look-up table therefore lies in a square box whose diagonally opposite corners are defined by $X_{min}$, $Y_{min}$ and $X_{max}$, $Y_{max}$. According to the invention, the points $X_{low}$, $Y_{low}$ and $X_{high}$, $Y_{high}$ may be placed outside of the aforementioned box for the purpose of establishing the shape of the look-up table function, which is later clipped to the box limits. The placing of $X_{low}$, $Y_{low}$ or $X_{high}$, $Y_{high}$ is determined by a threshold T. If $X_S$−$X_{min}$ is greater than or equal to T, $X_{low}$, $Y_{low}$ is placed at $X_{min}$, $Y_{min}$. Similarly, if $X_{max}$−$X_S$ is greater than or equal to T, $X_{high}$, $Y_{high}$ is placed at $X_{max}$, $Y_{max}$. However, if $X_S$−$X_{min}$ is less than T then $X_{low}$, $Y_{low}$ is displaced outside of the aforementioned look-up table box along the diagonal line defined by the points $X_{min}$, $Y_{min}$ and $X_{max}$, $Y_{max}$. The amount of displacement is greater the closer $X_S$ lies to $X_{min}$. Similarly if $X_{max}-X_S$ is less than T then $X_{high}$, $Y_{high}$ is displaced outside of the look-up table box along its diagonal. Again, the amount of displacement is greater the closer $X_S$ lies to $X_{max}$. The effect of this procedure is to remove the requirement that the colors black and white be simultaneously present in the image. Thus, the value of $X_{low}$ is calculated according to:

$$X_{low}=\min(X_{min}, [X_{min}+F(X_S-T)]), \text{ and where } Y_{low}=X_{low}$$

and similarly the value of $X_{high}$ is calculated according to:

$$X_{high}=\max(X_{max}, [X_{max}+F(X_S-X_{max}+T)]), \text{ and where } Y_{high}=X_{high}$$

wherein F is a constant. A suitable value for this constant F is from about 0.5 to about 4, with a preferred value of about 2. The threshold T is chosen with respect to the range $X_{max}-X_{min}$. Suitable values of T are from about 5% to about 40% of this range, with a preferred value of about 20% of this range. Thus, for the common case of 8-bit integers in the range 0 to 255, a preferred value of T is about 50. Once the location of the points $X_{low}$, $Y_{low}$ and $X_{high}$, $Y_{high}$ is established a function is fitted through these two points and the point $X_S$, $Y_T$. A preferred function is the cubic spline whose the second derivatives at $X_{low}$, $Y_{low}$ and $X_{high}$, $Y_{high}$ are set to zero. Using this function, a look-up table is constructed having Y values corresponding to every X value in the interval $X_{min}$ to $X_{max}$ inclusive and the table is applied to convert the color data of the original image to a modified image.

What is claimed is:

1. A method of providing a tone reproduction curve relating to a first image, the tone reproduction curve defined by at least three points selected from the group consisting of an original minimum color value, an original maximum color value, and a user specified control point (USCP) that represents a change in color value from an original color value in an image to a desired color value, the method comprising:

defining at least one threshold color value, the threshold color value defining a threshold color value in relationship to at least one of the original minimum color value or the original maximum color value, the threshold color value defining a threshold where if the USCP lies either between an original minimum color value and a minimum threshold color value defined in relationship therewith or between an original maximum color value and a maximum threshold color value defined in relationship therewith, the original minimum or maximum color value associated with that threshold is conceptually moved farther from the position of that original minimum or maximum color value to form a conceptual minimum color value or conceptual maximum color value, and then creating a monotonic tone reproduction curve through:

a) the conceptual minimum color value or conceptual maximum color value, b) the USCP, and c) the original minimum color value or original maximum color value that was not associated with the threshold.

2. The method of claim 1 wherein the monotonic tone reproduction curve restricts color values that may be selected for imaging from the curve to color values between the original maximum color value and the original minimum color value.

3. The method of claim 1 wherein the monotonic tone reproduction curve is created by selecting a first color to be corrected, selecting a second color to replace the first color, and using the first and second color to define the USCP.

4. The method of claim 1 wherein the tone reproduction curve comprises a spline curve.

5. The method of claim 1 wherein the tone reproduction curve comprises a cubic spline curve.

6. The method of claim 3 wherein the second color is chosen by an operator selecting a color from within the first image.

7. The method of claim 3 wherein the second color is chosen by an operator selecting a color from a second image.

8. The method of claim 3 wherein the second color is chosen by an operator selecting a color from a stored collection of colors.

9. The method of claim 3 wherein the second color is selected by an operator selecting a color from memory colors.

10. The method of claim 8 wherein the stored collection of colors is stored as generic named files having species sub-files of named colors listed in the generic named files.

11. The method of claim 10 wherein the generic named files comprise at least one generic named file selected from the group consisting of vegetation, grass, grasses, foliage, skin tones, flesh tones, trees, sky, wood, eyes, hair, fruits, vegetables, water, sun, dawn, dusk, sunrise, sunset, foods, beverages, eye colors, metals, stained glass colors, primary colors, achromatic colors, and animals.

12. The method of claim 1 wherein the monotonic tone reproduction curve restricts color values that may be selected for imaging from the curve to color values available from an associated image reproduction system.

13. A color correction system for correcting colors in a color image comprising:

coordinates for registering points in a first color space of at least one standard point, the first color space having axes for specifying colors;

a second set of coordinates for registering points in a second color space of at least one standard point, the second color space having axes that include at least one coordinate for specifying color hues;

a translator to convert image data from at least one point in the first color space to coordinates in the second color space;

a modifier for modifying at least hue within image data in the second color space to form corrected image data in the second color space, whereby the modifier is adapted to determine whether a user specified control point is within a threshold defined adjacent an original maximum or minimum color value and adapted to move outside the range of original maximum or minimum color values when the user specified control point is within such a threshold of the maximum or minimum limits of color values to create a conceptual maximum or minimum color value, the modifier also being adapted to generate a color correction curve using a specified control point, one of an original maximum or minimum color value and one of a conceptual maximum or minimum color value;

a translator for transferring corrected image data in the second color space to corrected image data in the first color space.

14. The color correction system of claim 13 wherein all points are provided within a tone reproduction curve.

15. The color correction system of claim 13 wherein the modifier corrects hue and at least one other color component selected from lightness, chroma and saturation in the second color space.

16. The color correction system of claim 13 wherein the modifier corrects hue and at least two other color components selected from the group consisting of chroma, lightness and saturation in the second color space.

17. The color correction system of claim 13 wherein the first color space comprises a three-color color space.

18. The color correction system of claim 13 wherein the first color space comprises a three-color color space of red, green and blue.

19. A method for correcting colors in a color image comprising:

providing image data of points in a first color space, the first color space having axes for specifying colors;

converting image data points in the first color space into image data points in a second color space, the second color space having coordinates that include at least one coordinate for hue for specifying colors;

modifying at least hue of at least some data points within image data in the second color space to form corrected image data in the second color space, whereby this modifying provides for determining whether a user specified control point is within a threshold defined adjacent an original maximum or minimum color value and for movement outside the range of original maximum or minimum color values when the user specified control point is within such a threshold of the maximum or minimum limits of color values to create a conceptual maximum or minimum color value, the modifying also providing for generating a color correction curve using a user specified control point, one of an original maximum or minimum color value and one of a conceptual maximum or minimum color value;

transferring corrected image data in the second color space to the first color space as corrected data.

20. The method of claim 19 wherein the first color space defines colors in color channels.

21. The method of claim 19 wherein the first color space defines colors in color channels of red, green and blue.

22. The method of claim 19 wherein modifying at least hue comprises modifying hue and at least one other color space component selected from the group consisting of lightness and saturation.

23. The method of claim 19 wherein modifying at least hue comprises modifying hue and both lightness and saturation.

24. The method of claim 19 wherein modifying is effected by a procedure selected from the group consisting of selecting specific image color data to replace converted image data in the second color space, selecting a palette from which to select a specific color to replace converted image data in the second color space, and selecting colors from a look-up table.

25. The process of claim 19 wherein image data points in the first color space are selected for correction by application of a pointer to a representation of the image.

26. The process of claim 19 wherein upon modifying image data in the second color space, and where there is no direction given in the modification to alter saturation, a predetermined amount of change in saturation is provided into image data in the second color space to cause a slight visual change of the image.

27. A computer readable medium having computer executable instructions for performing steps comprising:

providing image data of points in a first color space, the first color space having axes for specifying colors;

converting image data points in the first color space into image data points in a second color space, the second color space having coordinates that include at least one coordinate for hue for specifying colors;

modifying at least hue of at least some data points within image data in the second color space to form corrected image data in the second color space, whereby this modifying provides for determining whether a user specified control point is within a threshold defined adjacent an original maximum or minimum color value and for movement outside the range of original maximum or minimum color values when the user specified control point is within such a threshold of the maximum or minimum limits of color values to create a conceptual maximum or minimum color value, the modifying also providing for generating a color correction curve using a user specified control point, one of an original maximum or minimum color value and one of a conceptual maximum or minimum color value;

transferring corrected image data in the second color space to the first color space as corrected data.

28. A computer readable medium having computer executable instructions for performing steps comprising:

providing a tone reproduction curve relating to a first image, the tone reproduction curve defined by at least three points selected from the group consisting of an original minimum color value, an original maximum color value, and a user specified control point (USCP) that represents a change in color value from an original color value in an image to a desired color value;

defining at least one threshold color value, the threshold color value defining a threshold color value in relationship to at least one of the original minimum color value or the original maximum color value, the threshold color value defining a threshold where if the USCP lies either between an original minimum color value and a minimum threshold color value defined in relationship therewith or between an original maximum color value and a maximum threshold color value defined in relationship therewith, the original minimum or maximum color value associated with that threshold is conceptually moved farther from the position of that original minimum or maximum color value to form a conceptual minimum color value or conceptual maximum color value, and then creating a monotonic tone reproduction curve through:

a) the conceptual minimum color value or conceptual maximum color value, b) the USCP, and c) the original minimum color value or original maximum color value that was not associated with the threshold.

29. A computer readable medium having computer executable instructions for performing steps comprising:

establishing color range limits for a color image to be subjected to color modification, the color range limits including an original minimum color value and an original maximum color value;

establishing a user specified control point (USCP) representative of a first color to be modified and a second color to replace the first color;

defining at least one threshold color value, the threshold color value defining a threshold color value in relationship to at least one of the original minimum color value or the original maximum color value;

determining whether the USCP lies either between an original minimum color value and a minimum threshold color value defined in relationship therewith or between an original maximum color value and a maximum threshold color value defined in relationship therewith, moving the original minimum color value or the original maximum color value conceptually farther from the position of that original minimum or maximum color value to form a conceptual minimum color value or conceptual maximum color value, if the USCP has been determined to be within the threshold of the determining step; and then creating a monotonic tone reproduction curve through:

a) the conceptual minimum color value or conceptual maximum color value, b) the USCP, and c) the original minimum color value or original maximum color value that was not associated with the threshold.

* * * * *